UNITED STATES PATENT OFFICE.

CARL SCHMIDT, OF MAGDEBURG, GERMANY.

PROCESS OF SEPARATING WOOL-FAT INTO ITS PRODUCTS.

SPECIFICATION forming part of Letters Patent No. 632,791, dated September 12, 1899.

Application filed September 17, 1896. Serial No. 606,156. (No specimens.)

*To all whom it may concern:*

Be it known that I, CARL SCHMIDT, a subject of the King of Prussia, German Emperor, residing at Magdeburg-Buckau, in the Empire of Germany, have invented certain new and useful Improvements in Processes of Producing Chemical Combinations from Raw Wool-Fat, of which the following is a specification.

This invention produces by steps from raw or distilled wool-fat sebacic acids, soaps, combinations with a high melting-point fit for the manufacture of candles, and other substances of the wool-fat, which cannot be saponified and which consist of a mixture of fat-alcohols with other unknown chemical combinations, and, finally, the transformation of these unsaponifiable substances into their combinations with water.

It is known that raw wool-fat consists, essentially, of ether-like combinations of higher and lower sebacic acids with cholesterine, isocholesterine, and other fat-alcohols. It contains, besides free sebacic acids, mostly fat-alcohols and cholesterine. Distilled wool-fat comprises saponifiable wool-fat, and consists of a mixture of free sebacic acids and fat-alcohols; but besides it contains neutral substances which cannot be saponified and are products of decomposition of the wool-fat produced by the distillation.

The present process is divided into four steps, the succession of which can be changed in any manner, by which is produced, first, a separation of the wool-fat into one part containing nearly exclusively sebacic acids and into another part consisting of a mixture of sebacic acids and fat-alcohols; second, from this mixture of sebacic acids and fat-alcohols by appropriate treatment combinations can be obtained, melting between 60° to 75° centigrade, which consists, essentially, of sebacic acids; third, the remaining portion being divided into nearly pure sebacic acids and into fat-alcohols, which latter still contain a few sebacic acids; fourth, finally the purified fat-alcohols are worked into their combinations with water.

Making use of these four steps in this succession or in the changed succession as described later, in order to separate wool-fat in its constituents, is what I claim as new.

To execute this process, there can be used raw wool-fat or saponified or distilled wool-fat.

A. If there is used raw wool-fat, one proceeds in the following manner:

I. In order to separate the raw wool-fat into nearly pure sebacic acids on the one side and into a mixture of sebacic acids and fat-alcohols on the other side, it is treated conveniently at water-bath temperature with a double quantity of alcoholic ammonia, whereby twenty to thirty per cent. of the fat is easily dissolved, the free sebacic acids being converted into ammonia salts and a part of the wool-fat being divided into sebacic-acid amides and free fat-alcohols. The used alcoholic ammonia is produced by mixing alcohol of about eighty to ninety per cent. with concentrated watery ammonia or by saturating alcohol of eighty to ninety per cent. with ammonia-gas at ordinary temperature. After depositing, the still warm alcoholic solution is decanted from the deposit, and the decomposition of the latter can only be obtained by repeating several times the described operation or by introducing ammonia-gas into a boiling mixture of alcohol and deposit until complete solution is obtained; but the complete solution and decomposition of the deposit are obtained in a simple manner by heating it with alcohol ammonia under pressure. For this purpose the deposit is placed in a closed apparatus, which may be fitted with an agitator, and with gradual increase of temperature it is heated with the requisite quantity of alcoholic ammonia until all the wool-fat is dissolved, and it is left under pressure until it is found by treating a sample drawn from the reaction product that after it has cooled it will become fluid and dissolve again on warming under ordinary atmospheric pressure. Then all the obtained alcoholic solutions are mixed and heated again until a clear solution is obtained and a few not saponified wool-fat quantities are parted with. The solution decanted from the small quantity of not saponified wool-fat on cooling deposits in crystalline combinations a mixture of fat-alcohols and ammonia-fat acid combinations, while nearly pure ammonia-sebacic-acid combinations remain dissolved. The solid combinations are separated in a convenient manner from the alcoholic solution. The latter is freed by distillation from alcohol and ammonia and the deposit, after mixing it with an equal quantity, by weight, of sulfuric acid or muriatic acid of twenty to forty per cent. strength, is heated by introducing steam for two to three hours. When leaving the mixture to stand without heating it, the sebacic acids separate on the surface of the sulfuric or muriatic acid as a yellow oil, which is then further worked in the known manner. The solid combinations are heated in a distilling apparatus at 100° centigrade until they are freed from alcohol and ammonia, and then the deposit is heated with sulfuric acid or muriatic acid of twenty to forty per cent. strength, as above described, whereby the mixture of the fat alcohols and sebacic acids is separated as a yellow oil.

II. To obtain the combinations with a high melting-point, this oil is dissolved by heating in acetone. Then by cooling the acetone solution there are deposited solid crystalline combinations, which are filtered and washed with acetone until they look nearly pure white. The same after being freed from acetone and dried at 100° centigrade give an oil which on cooling congeals to a crystalline mass with a melting-point lying between 60° and 75° centigrade.

III. If, then, to the filtered acetone solution there is added the quantity necessary of a concentrated alkali solution to convert the still-existing sebacic acids into soaps, which is found by chemical analysis, the greatest part of the sebacic acids is separated as soaps, which can easily be filtered and washed with acetone. Also the production of the high-melting combinations can be left and, as hereinbefore described, the sebacic acids can be separated as soaps. The filtered soaps can be used as such or be worked in known manner as sebacic acids.

IV. The solution separated from the soaps is freed by distillation from acetone, the deposit is dissolved and boiled several hours with a concentrated alcoholic alkali solution, and at last the alcohol is freed by distillation also. The deposit being obtained, which contains besides fat-alcohols small quantities of sebacic-acid soaps, is treated further in the following manner: It is boiled two hours with twice its weight of diluted alcohol of five to ten per cent. strength and is then kneaded while cooling with the same solvent, whereby the soaps are dissolved and the fat-alcohols are transformed into a soft or viscid mass, being a combination of the fat-alcohols with water. Then after finishing the kneading process and decanting the resulting diluted alcoholic-soap solution this mass is also kneaded at ordinary temperature, at first with a further quantity of the same diluted alcohol of five to ten per cent. and at last with three to four parts, by weight, of water, whereby the water-containing fat-alcohols are produced as a nearly white mass of soft consistence; or the deposit after washing with diluted sulfuric or muriatic acid of about thirty per cent. strength and with water is submitted to distillation in or without a vacuum or with superheated steam, whereby the sebacic acids distil over first and then about eighty per cent. of the fat-alcohols as a thick oil, which for removal of any existing fat-acids and for producing water-containing combinations is boiled and kneaded, as before said, first with twice its weight of a diluted alcohol of five to ten per cent. strength containing two portions of alkali solution of 40° Baumé to every hundred portions of diluted alcohol, and again with the same quantity of diluted alcohol of five to ten per cent., and lastly with three to four parts, by weight, of water; or the deposit can be dissolved in ether, benzene, or other solvents, the soaps can be removed by washing the obtained solution with water, and then after the solvent has been distilled off the resulting residuum—the fat-alcohols—can be transformed into the corresponding softer combinations by kneading the residuum while cooling with three to four parts of its weight of hot water and repeating the kneading operation two or three times with the resulting mass with the same quantity of water at ordinary temperature until a soft nearly white mass is produced.

B. If saponified wool-fat, which can be produced in the known manner—for instance, by means of alcoholic alkalies and decomposition of the reaction products with acids or by distillation with or without superheated steam and in or without a vacuum or in any other manner—is treated with alcoholic ammonia as above said, it is completely dissolved. On cooling a mixture of fat-alcohols and sebacic-acid ammonia salts is parted with, while nearly pure sebacic acids remain dissolved. The combinations are separated and further worked in the same manner as aforesaid in I to IV. The used alcohol ammonia is produced as above said; but working saponifiable or distilled wool-fat there can be used also strongly-diluted alcohol ammonia or alkali, and then one proceeds in the following manner: Saponified or distilled wool-fat is heated at water-bath temperature in a convenient apparatus with twice the quantity of alcohol of ten to fifty per cent., and then while agitating the diluted alcohol and the wool-fat there is added the requisite quantity of concentrated aqueous ammonia or alkali to transfer the sebacic acids of the wool-fat into soaps, whereby the greatest part of the fat is dissolved. The requisite quantity of alkali or ammonia for this process is found by chemical analysis and is variable for the various wool-fats; but there may be added to one hundred pounds of wool-fat about twelve pounds of solid potassium hydrate ($KOH$) or nine pounds of solid sodium hydrate ($NaOH$) or four pounds of ammonia-gas, ($NH_3$,) these being used as concentrated aqueous solutions, as above said. Leaving this solution without agitating it an oil is parted with on the surface or at the base of the solution and the latter is clarified. The still warm solution containing preponderately sebacic acids, as ammonia or alkali soaps, is separated from the oil, freed from alcohol by distillation, and then the resulting watery-soap solution is worked in known manner as soaps or as sebacic acids. The oil separated from the soap solution contains the fat-alcohols or neutral substances and the sebacic-acid soaps hardly soluble in diluted alcohol. This oil is worked as described under III and IV after heating it with acids and washing with water. If there is to be worked up saponified or distilled wool-fat, the succession of the operations I to IV can be changed in any manner—for example, the fat is dissolved at first in acetone to produce the high-melting combinations, as said at II, then by adding a concentrated alkali solution to the filtered acetone solution the soaps are obtained, and finally the fat-alcohols are produced, as said under IV, or the fat is dissolved at first in acetone, the production of the high-melting combinations can be left by separating the sebacic acids as soaps at III and working the resulting acetone solution as said under IV.

C. If distilled wool-fat is to be worked, it is preferable to execute this process in another manner.

The distilled wool-fat is a mixture of oily and solid combinations. It is separated in a convenient manner into an oily and into a solid product—for example, by distillation in fractions of the raw wool-fat receiving the first oily distillate amounting to thirty per cent. of fat separately from the later product of more solid consistence. Both products are mixtures of free sebacic acids and fat-alcohols or neutral substances, which are worked in the following manner: The latter solid product is dissolved at first in acetone, producing according to II the high-melting combinations. Then the oily product can be dissolved in the filtered acetone solution and the resulting solution can be worked farther, as described under III and IV. Or the acetone solution filtered from the high-melting combinations is freed by distillation from acetone and the deposit mixed with the oily product is worked further, preferably with diluted alcoholic alkali, as said under B. In this process there can be used instead of acetone benzene, ether, tar-oils, &c., to produce the high-melting combinations, as described under II; but to produce the soaps, as described under III, there can be only used acetone or mixtures of acetone with ether or with benzene or with chloroform. Therefore if there are used other solvents producing the high-melting combinations these solvents must be separated by distillation and the deposit must be dissolved in acetone or in a mixture of acetone with the said other solvents before the soaps can be produced by adding alkali solution, as said under III.

I claim as my invention—

1. An improved process for producing sebacic acids and soaps on one side and fat-alcohols or unsaponifiable substances and their combinations with water on the other side, consisting in separating raw wool-fat at first; by boiling and heating under pressure with alcoholic ammonia and by crystallization of the resulting solution into a part containing nearly pure ammonia sebacic acid combinations in solution and into another part consisting of a mixture of unsaponifiable substances and ammonia fat acid combinations undissolved; second; separating from the last-mentioned mixture after treating it with diluted sulfuric acid by crystallization from acetone, combinations melting between 60° and 75° centigrade, consisting preponderately of sebacic acids; third; separating from the solution resulting from the second separation a further part of the sebacic acids as soaps by adding to said solution a concentrated alkali solution; and last; cleaning the impure unsaponifiable substances which are obtained as deposit, when the solution filtered from the soaps is freed from acetone, by boiling with diluted alcohol and producing their water-containing combinations by kneading with water.

2. An improved process for producing sebacic acids and soaps on one side and fat-alcohol or unsaponifiable substances and their combinations with water on the other side, consisting in separating saponified wool-fat at first by heating with alcoholic ammonia and by crystallization of the resulting solution into a part containing nearly pure ammonia soaps which remain dissolved and into another part consisting of a mixture of unsaponifiable substances and ammonia soaps, which is separated; second, separating from the last-mentioned mixture after treating it with diluted sulfuric acid by crystallization from acetone, combinations melting between 60° to 70° centigrade consisting preponderately of sebacic acids; third, separating from the solution resulting from the second separation a further part of the sebacic acids as soaps by adding to said solution a concentrated alkali solution and last, treating the impure unsaponifiable substances, obtained as deposit, when the solution filtered from the soaps is freed from acetone, by dissolving in ether and washing the resulting solution with alkali solution and water, and then distilling off the ether and kneading the unsaponifiable substances obtained as deposit with water, whereby their water-containing combinations are produced.

3. An improved process for producing sebacic acids and soaps on one side and fat-alcohols or unsaponifiable substances and their combinations with water on the other side, consisting in dissolving saponified wool-fat at first in acetone and separating as a deposit the greatest part of the sebacic acids as soaps by adding a concentrated alkali solution to the resulting acetone solution; filtering the solution from said soaps, evaporating the solution and thus obtaining the impure unsaponifiable substances dissolving the latter in ether and washing the resulting solution with alkali solution and water, distilling off the ether also, and kneading the deposit, the unsaponifiable substances, with water, whereby their water-containing combinations are produced.

4. An improved process for producing sebacic acids and soaps on one side and fat-alcohols or unsaponifiable substances and their combinations with water on the other side consisting in separating distilled wool-fat by heating with alcoholic alkali into a part containing preponderately alkali soaps, which are dissolved and into another part consisting of mixture of unsaponifiable substances and alkali soaps, which is not dissolved; then dissolving the last-mentioned mixture in ether and washing the resulting solution with alkali solution and water, then distilling off the solvent and kneading the deposit, the unsaponifiable substances, with water, whereby their water-containing combinations are produced.

5. An improved process for producing sebacic acids and soaps on one side and fat-alcohols or unsaponifiable substances and their combinations with water on the other side consisting in separating raw wool-fat in the known manner by fractional distillation into an oily and into a solid distillate and then dissolving the solid distillate in hot acetone and producing the crystalline combinations, melting between 60° to 70° centigrade which are deposited by cooling the resulting solution; then dissolving the oily distillate in the solution, filtered from the crystalline combinations, and parting with a further part of sebacic acids by adding a concentrated alkali solution to the obtained solution and then submitting to distillation the impure unsaponifiable substances, obtained as deposit, when the solution filtered from the soaps is freed from acetone, then kneading the resulting distillate at first with diluted alcoholic alkali, then with diluted alcohol and at last with water, whereby the water-containing combinations are produced.

In witness whereof I have signed this specification in presence of two witnesses.

CARL SCHMIDT.

Witnesses:
JULIUS MUTH,
M. C. MUTH.